United States Patent [19]

Gotanda

[11] Patent Number: 4,565,090
[45] Date of Patent: Jan. 21, 1986

[54] DETECTION DEVICE FOR DETECTING AND INDICATING OPERATION OF A GAS METER

[76] Inventor: Motohiro Gotanda, No. 1802-10, Nakabyo, Abiko City, Chiba Prefecture, Japan

[21] Appl. No.: 542,538

[22] Filed: Oct. 17, 1983

[51] Int. Cl.[4] .............................................. G01F 3/20
[52] U.S. Cl. ................................... 73/198; 73/861.77; 73/263; 340/606
[58] Field of Search .................................. 73/263–269, 73/198, 861.77, 861.78; 340/606, 610

[56] References Cited

U.S. PATENT DOCUMENTS

| | | | |
|---|---|---|---|
| 3,039,311 | 6/1962 | Bassett | 73/272 A X |
| 3,559,197 | 1/1971 | Jarvis | 340/610 |
| 3,610,039 | 10/1971 | Althouse | 73/861.77 |
| 3,874,233 | 4/1975 | Sanctuary et al. | 73/264 |
| 4,101,874 | 7/1978 | Denison | 340/608 X |
| 4,191,951 | 3/1980 | Fuzzell | 340/610 |
| 4,399,709 | 8/1923 | Scharnitzity | 73/861.77 |
| 4,437,347 | 3/1984 | Bronsky et al. | 73/272 R |

FOREIGN PATENT DOCUMENTS 0095828  7/1980  Japan ...................................... 73/269

Primary Examiner—Herbert Goldstein
Attorney, Agent, or Firm—Larson and Taylor

[57] ABSTRACT

In the gas meter comprising a housing made of non-magnetic material and provided with gas inlet and outlet, a driver section provided with a rotating member rotated in accordance to the flow amount of gas, and a meter driven by the driver section to display the flow amount of gas, a detector device for detecting whether or not gas is being used in a room or inside a house characterized by a magnetic material attached to the rotating member, by a sensor or sensors attached to the outer face of the housing to detect the rotation of the rotating member, and by a display driven by the output of the sensor to display whether or not gas is being used.

3 Claims, 23 Drawing Figures

DETECTION DEVICE FOR DETECTING AND INDICATING OPERATION OF A GAS METER

BACKGROUND OF THE INVENTION

The present invention relates to a detector device for easily, securely and reliably detecting whether or not fuel gas is being used in a room or inside a house.

Gas explosion has often been caused by fuel gas leaked in rooms inside mansions, houses, buildings and so on and the common manner of detecting gas leak like this is to provide a gas detector which is rendered operative when gas leaked into air amounts to more than a predetermined value. This manner, however, is intended to detect toxic or explosive gas which has been once dispersed into and diluted by air, thus making it impossible to detect gas until a sonsiderable amount of leaked gas occupies the air in a room. When the gas detector is made highly sensitive to the contrary, it is redered operative by gas such as alcohol evaporated on cooking, and gas sprayed for beauty make-up, for example, as well as fuel gas leaked. In short, this highly sensitive gas detector is likely to often cause malfunction.

SUMMARY OF THE INVENTION

The present invention is therefore intended to eliminate the above-mentioned drawback.

According to the present invention there is provided a detector device for detecting whether or not gas is being used in a room or inside a house and comprising a magnetic material attached to the rotating member in the gas meter driver section, sensors attached to the outer face of the gas meter housing to detect the rotation of the rotating member, and a display made operative by outpus applied from the sensors to display that gas is being used.

A first object of the present invention is to detect whether or not gas is being used in a room or inside a house to always make sure of whether gas is leaked or not.

A second object of the present invention is to detect the flow of gas and display it so as to reliably and easily know whether gas is leaked or not.

A third object of the present invention is to detect the flow of gas and shut off it, if necessary.

These objects can be achieved by a mechanism, an electrical circuit, and the operation thereof which form the present invention, and some embodiments of the present invention will be described in detail referring to the accompanying drawings. It should be understood that variations and modifications relating to the detail of the mechanism and circuit are included in the scope of claims appended.

BRIEF DESCRIPTION OF THE DRAWINGS

FIGS. 3b and 3c are waveforms intended to explain the operation of the electrical circuit shown in FIG. 3a.

FIG. 4b is a waveform intended to explain the oepration of the electrical circuit shown in FIG. 4a.

FIG. 5b is a plane view showing essential parts when the upper side cover is removed from the gas meter shown in FIG. 5a.

FIG. 8b is an enlarged plane view showing a cap for closing the window of the gas meter shown in FIG. 8a.

DETAILED DESCRIPTION OF THE PREFERRED EMBODIMENTS

Figure 1:
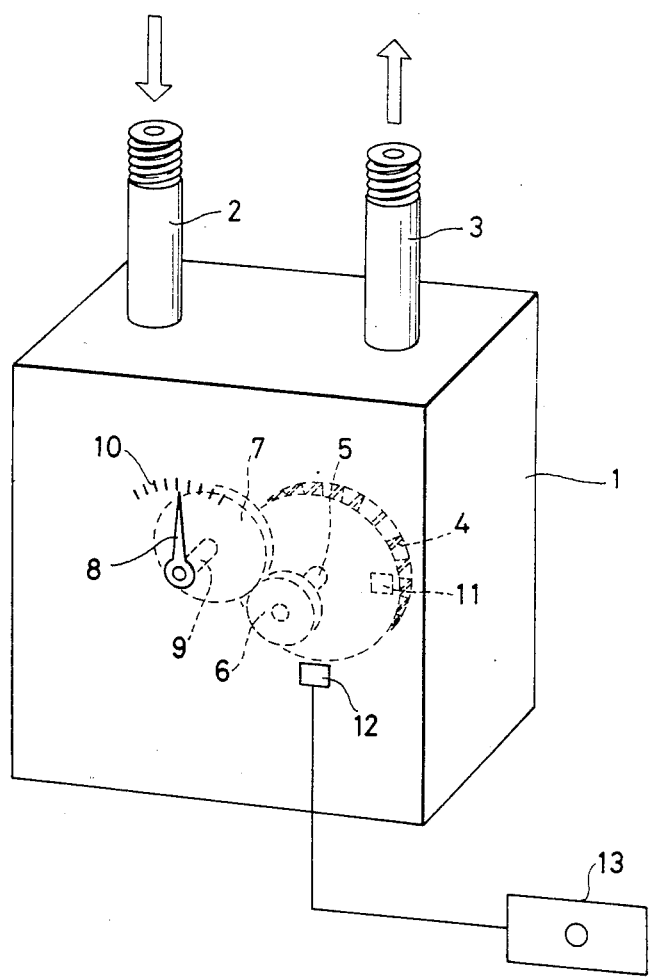
FIGS. 1 and 2 are perspective views showing embodiments of the present invention.
Figure 2:
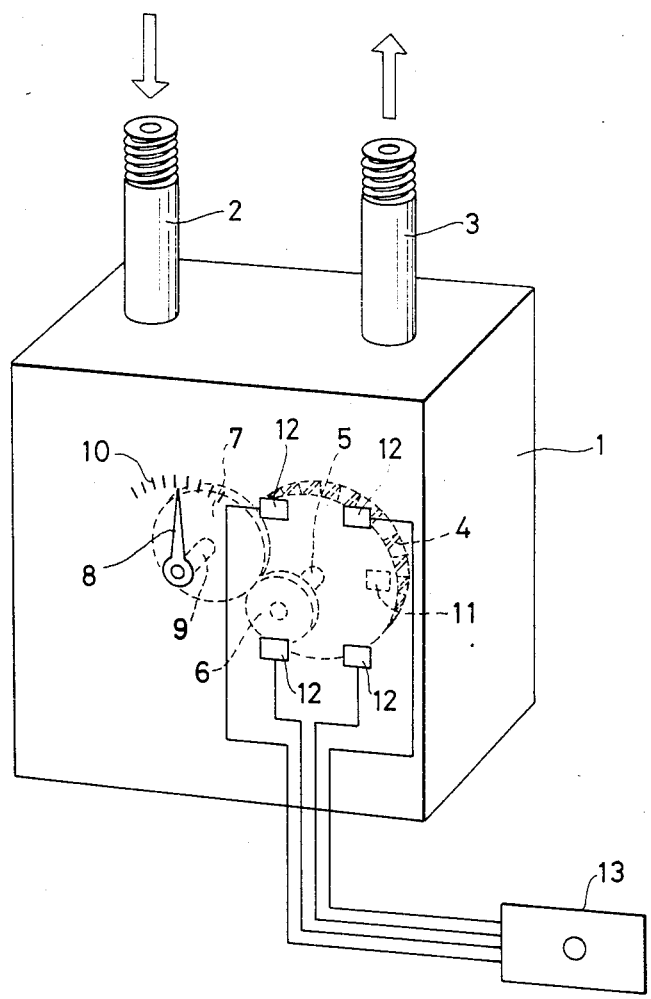

In FIG. 1, numeral 1 represents a housing made of non-magnetic material such as aluminum and provided with a gas inlet 2 and a gas outlet 3. A runner 4 is housed in the housing 1 to run in accordance to the amount of gas flowed. A shaft 5 of the runner 4 is arranged to drive a shaft 9 of a meter needle 8 through gears 6 and 7 which have an appropriate reduction ratio. Numeral 10 denotes a scale. The gas meter has the arrangement as described above. The means for moving the needle 8 is of integrating type and the scale is therefore arranged to display several units, but FIG. 1 shows only one unit. The gas meter may be of digital type. Numeral 11 represents a piece of magnet attached to the runner 4. The magnet may be a piece of iron or permanent magnet, but it is preferably non-magnetic like the piece of iron, because no electromotive force is caused by its rotation to guarantee safety. Numeral 12 represents a sensor attached to the outer face of the housing 1 and located on and adjacent to the rotating path of the magnetic material 11 which is on the runner 4 in the housing 1. Or it may be arranged so that sensors are located corresponding to the outer circumference of the runner 4 with a certain distance interposed therebetween (see FIG. 2). The sensor 12 may be of derived bridge type and comprise various kinds of proximity switches. Numeral 13 denotes a display where a lamp of LED, for example, is used.

The gas inlet 2 is connected to a gas source while the gas outlet 3 is connected to a load such as an oven. When no gas is supplied to the load, the flow amount of gas is zero, so that the runner 4 is not rotated keeping the needle 8 unchanged. No change is caused this time between the sensor 12 and the magnetic material 11 and in magnetic field, thus preventing the sensor 12 from generating output. Therefore, the display 13 displays no leak of gas.

When gas is used by the load, gas entered into the gas inlet 2 is supplied to the load through the gas outlet 3, rotating the runner 4. The number of rotations of the runner 4 is proportional to the amount of gas flowed. A pulse is generated by the sensor 12 every one or a fourth rotation of the runner 4 (which will be described later). The display 13 is made operative by this pulse to display that gas is being used. When the display 13 displays that gas is being used, in spite of using no gas, it can be therefore found that gas is leaking. Although the flow of gas is detected by the runner 4 in the above-described embodiment, it may be detected by a diaphragm or other means, as will be described later referring to FIG. 5a and others.

Figure 3A:
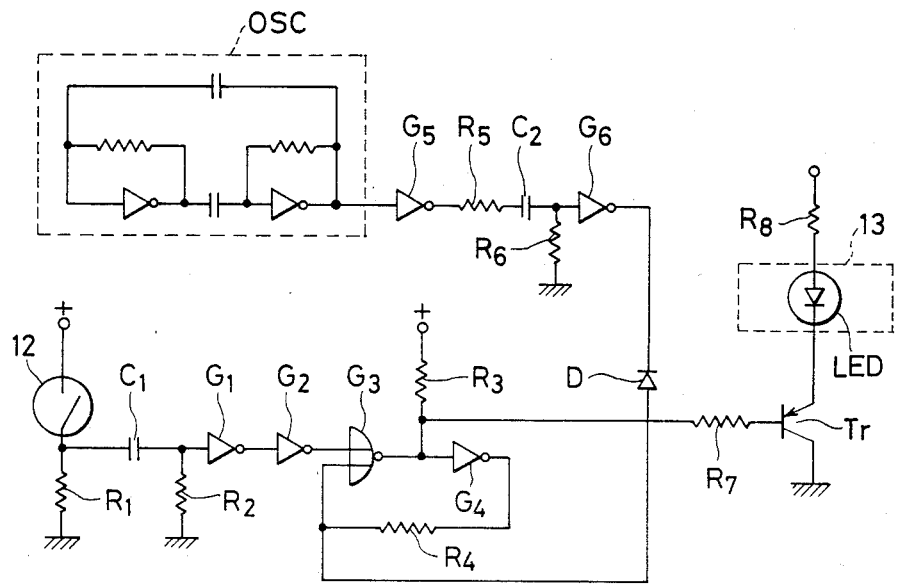
FIG. 3a shows an example of electrical circuit employed by the present invention.

In FIG. 3a, $R_1$–$R_3$ represent resistors, $C_1$ and $C_2$ capacitors, $G_1$, $G_2$, $G_4$, $G_5$ and $G_6$ inverters, $G_3$ a "nor" circuit, D a diode, OSC a low-frequency oscillator, Tr a transistor and LED a light-emitting diode incorporated in the display 13.

When an output is applied from the sensor 12, the capacitor $C_1$ is charged at a time constant which is determined by both of the capacitor $C_1$ and the resistor $R_2$. Therefore, output of the inverter $G_2$ becomes a short rectangular pulse. The provision of two inverters $G_1$ and $G_2$ is intended for wave-shaping. Even when the sensor 12 is stopped under on-state, therefore, only one pulse is generated from the inverter $G_2$.

Figure 3B:
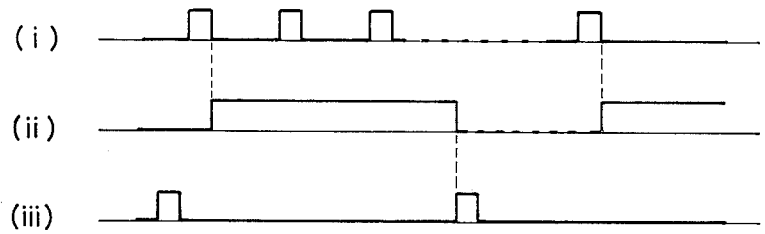

(i) in FIG. 3b shows output pulses applied from the sensor 12 wherein pulses are successively generated corresponding to the rotation of the runner 4. When it receives this pulse, the "nor" circuit $G_3$ applies "L"-stated output to the base of the transistor Tr to turn it on. The light-emitting diode LED is thus turned on to display that gas is flowing. On the other hand, output of the "nor" circuit $G_3$ is inverted by the inverter $G_4$ and applied to the input of the "nor" circuit $G_3$, whereby output of the "nor" circuit G is self-held "L"-stated, which state is shown by (ii) in FIG. 3b.

Output of the low-frequency oscillator OSC is inverted by the inverter $G_6$ to negative pulses, as shown by (iii) in FIG. 3b, and applied to the input of the "nor" circuit $G_3$. Output of the "nor" circuit $G_3$ therefore becomes "H"-stated to turn off the transistor Tr to thereby put off and reset the light-emitting diode LED. Unless output is again applied from the sensor 12, the light-emitting diode LED is kept turned-off.

Figure 3C:
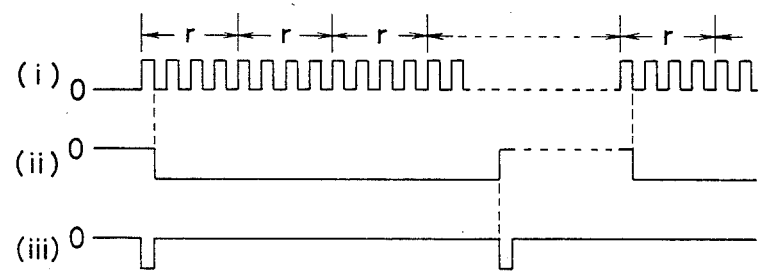

(i) in FIG. 3c shows output pulses of the sensor 12 wherein pulses are successively generated every one fourth rotation of the runner 4. r represents one rotation of the runner 4. When it receives this pulse, the "nor" circuit $G_3$ applies "L"-stated output to the base of the transistor Tr through the resistor $R_7$ to turn on the transistor Tr. The light-emitting diode LED is thus turned on to display that gas is flowing. On the other hand, output of the "nor" circuit $G_3$ is inverted by the inverter $G_4$ and applied to the input of the "nor" circuit $G_3$, whereby output of the "nor" circuit $G_3$ is self-held "L"-stated, which state is shown by (ii) in FIG. 3c.

Output of the low-frequency oscillator OSC is applied, as negative pulses, from the inverter $G_6$ to the input of the "nor" circuit $G_3$, as shown by (iii) in FIG. 3c. Output of the "nor" circuit $G_3$ therefore becomes "H"-stated to turn off the transistor Tr to thereby put off and reset the light-emitting diode LED. The light-emitting diode LED is kept turned-off, therefore, unless output is again applied from the sensor 12.

Figure 4A:
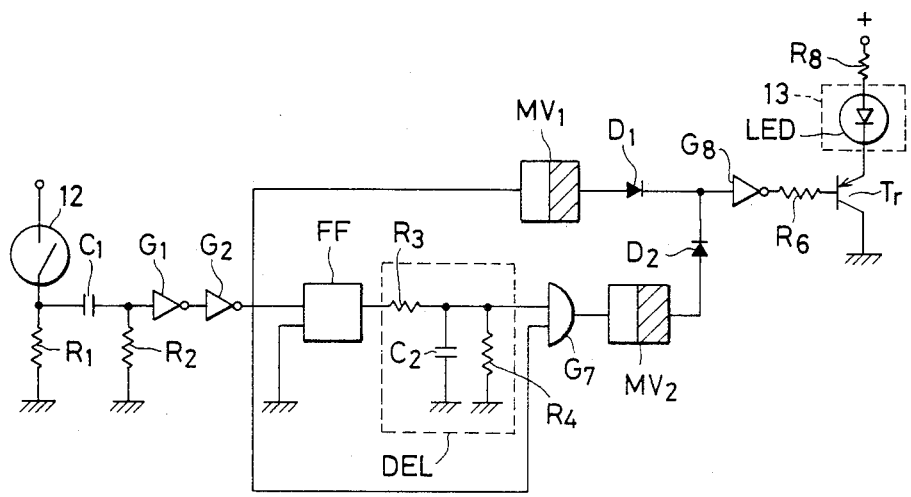
FIG. 4a shows another example of electrical circuit employed by the invention.

FIG. 4a shows another example of electric circuit wherein FF represents a flip-flop, $MV_1$ and $MV_2$ monostable multivibrators, $G_7$ an "and" circuit, $G_8$ an inverter, and $D_1$ and $D_2$ diodes. Same parts as those shown in FIG. 3a are represented by same symbols. DEL denotes a delay circuit comprising resistors $R_3$ and $R_4$ and a capacitor $C_2$.

Figure 4B:
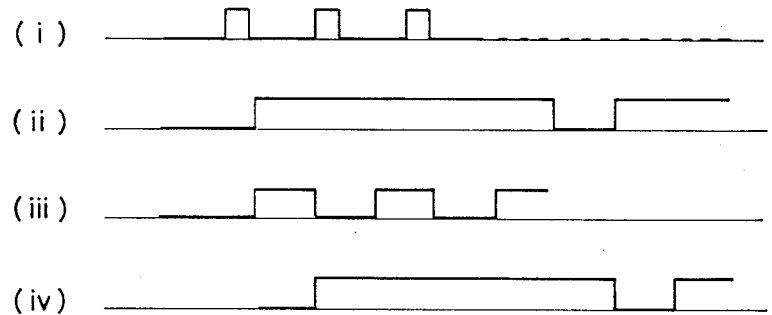

When the sensor 12 is turned on, one pulse is sent through the inverter $G_2$, similarly to the case shown in FIG. 3a. This pulse is applied to the monostable multivibrator $MV_1$, the flip-flop FF and an input terminal of the "and" circuit G, respectively. The monostable multivibrator $MV_1$ generates "H"-stated output during its self-holding time period, as shown by (ii) in FIG. 4b. On the other hand, the flip-flop FF applies output, shown by (iii) in FIG. 4b, to another input terminal of the "and" circuit $G_7$ through the delay circuit DEL. The time lapse delayed by the delay circuit DEL is set larger than the time constant of a differentiation circuit comprising a capacitor $C_1$ and a resistor $R_2$. Therefore, the "and" circuit $G_7$ is rendered operative in response to the second pulse of the sensor 12, and the monostable multivibrator $MV_2$ finally draws a waveform shown by (iv) in FIG. 4b. When the holding time of the multivibrator $MV_2$ is set equal to or longer than that of the monostable multivibrator $MV_1$, continuous lightening is kept during the operation of the sensor 12 by output composition of both multivibrators. The holding times (or cycles) of the monostable multivibrators $MV_1$ and $MV_2$ are made longer than the pulse cycle of the sensor 12.

Figure 5A:
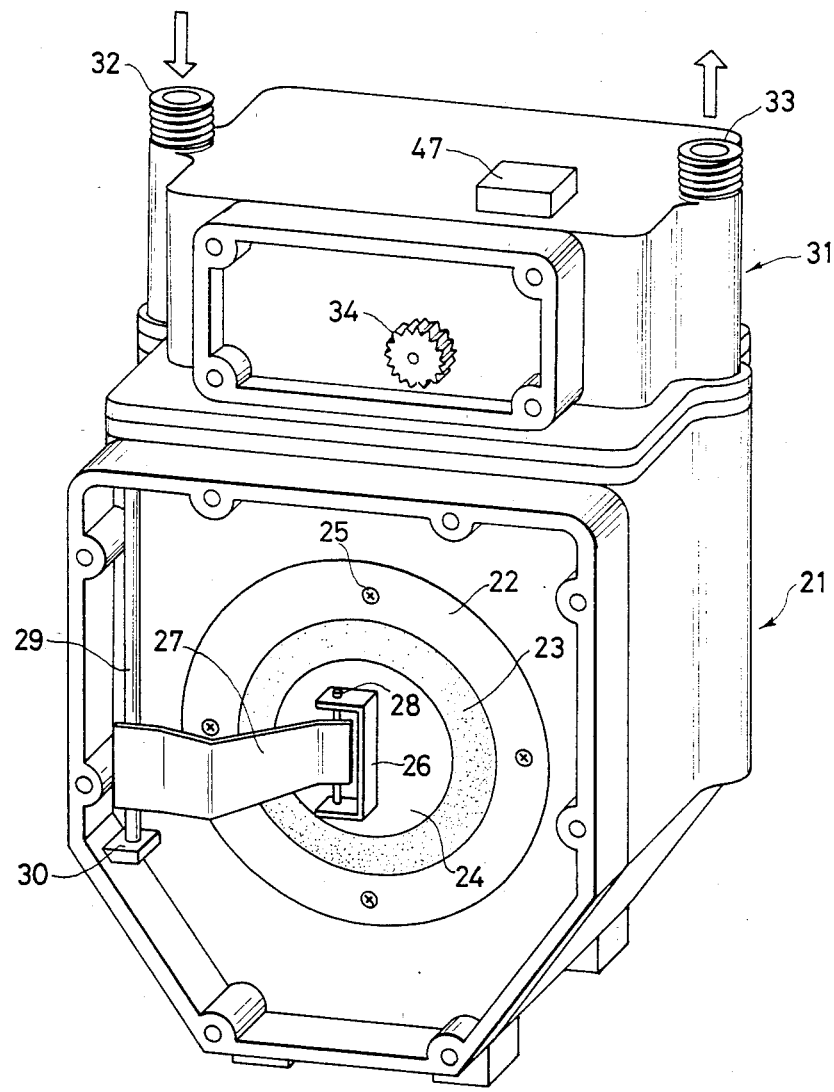
FIG. 5a is a perspective view showing the gas meter with its side cover removed, to which the present invention is applied.

FIG. 5a shows an existing gas meter to which the present invention is applied, wherein numeral 21 represents a gas meter body, which is provided with a large diameter hole in the center of a side partition wall, and a diaphragm is attached to the hole. The hollow portion inside the body 21 is divided into four chambers by the two side partition walls and a center partition wall. More specifically, numeral 22 represents a support plate provided with a hole in the center thereof, and a diaphragm 23 is attached to the support plate 22 and a cap plate 24 is attached to the diaphragm 23. The support plate 22 with the diaphragm 23 is attached to the large diameter hole in the side partition wall of the body 21 (FIG. 5a shows only the front side of the gas meter body 21 and it should be understood that an arrangement similar to that at the front side of the body 21 can be found at the back side thereof). The hollow portion inside the body 21 is thus air-tightly divided into the two side chambers and the two center chambers. To the cap plate 24 is fixed a metal fitting 26, to which one end of a metal arm 27 is hinged by a pin 28. The other end of the metal arm 27 is fixed to a rod 29, whose lower end is freely rotatably supported by a rod support 30 projected from the body 21. When the diaphragm 23 moves, therefore, the metal arm 27 is also moved accordingly to rotate the rod 29.

Numeral 31 represents an upper case provided with gas inlet and outlet 32 and 33, and with a rotary toothed wheel 34 on a side wall thereof. The wheel 34 is intended to use for the flow meter, which is not shown in FIG. 5a.

Figure 5B:
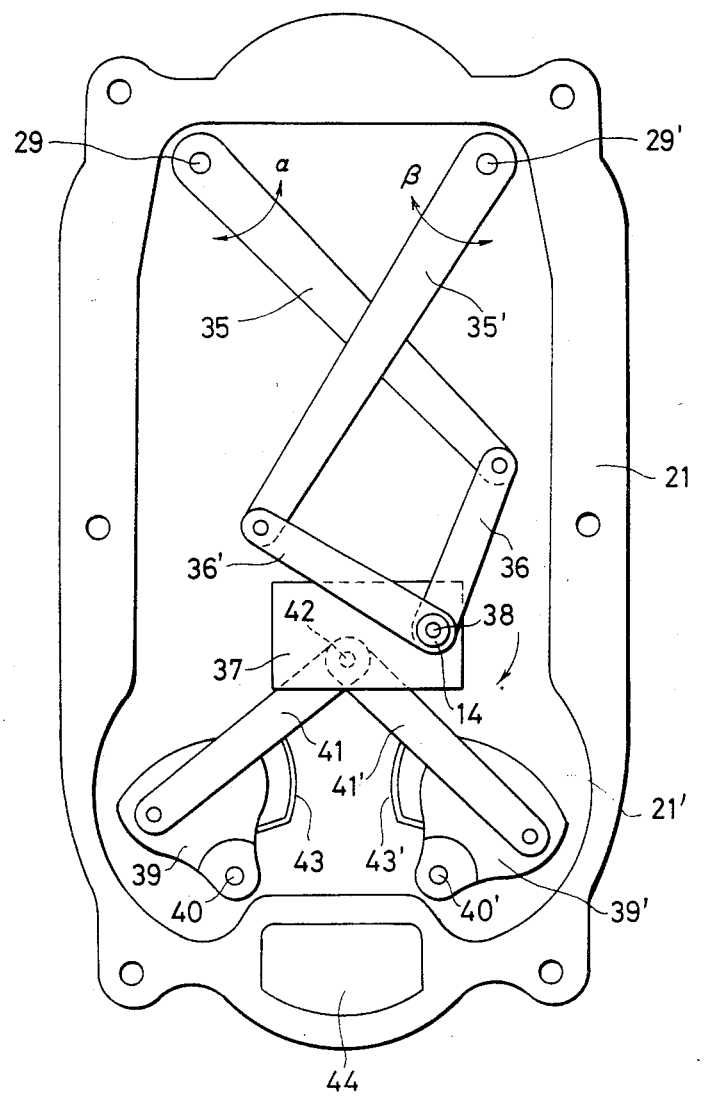
Figure 5C:
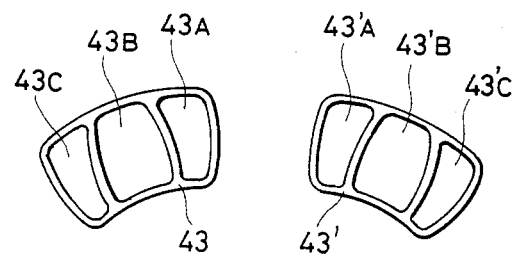
FIG. 5c is a plane view showing an arrangement of changeover passages employed. in the gas meter shown in FIG. 5b.

In FIG. 5b, numeral 29 represents the rod shown in FIG. 5a, and numeral 29' denotes another rod arranged at the back of the body 21 which is not shown in FIG. 5a. Numerals 35, 35', 36 and 36' represents linked arms, of which linked arms 36 and 36' are swingably attached to a pin 38 of a rotary plate 37. Numerals 39 and 39' denote changeover valves, which are swingably attached to a roof plate 21' of the body 21 through journal pins 40 and 40', respectively. One end of each of linked arms 41 and 41' is swingably attached to its corresponding changeover valve 39 or 39' while the other ends thereof is swingably attached to a pin 42 on the back of the rotary plate 37. The pins 38 and 42 are appropriately separated from each other not to coincide with each other. Numerals 43 and 43' represent changeover passages located under the changeover valves 39 and 39', respectively, and each of the changeover passages comprises three parts as shown in FIG. 5c. More specifically, passages 43A and 43'A in FIG. 5c communicate with the two central chambers in the hollow portion of the body 21, that is, chambers partitioned by the central partition wall and defined by the both side partition walls or diaphragms 23 and 23' (not shown); passages 43C and 43'C communicate with the two side chambers, respectively, said side chambers being defined by the two side walls and the diaphragms 23 and 23', respectivley; and passages 43B and 43'B communicate with a discharge passage 44 formed in the body 21. The discharge passage 44 communicates only with the gas outlet 33 when the upper case 31 is attached to the body 21.

Figure 5D:
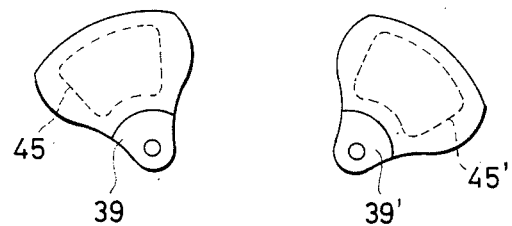
FIG. 5d is a plane view showing an arrangement of changeover valves employed in the gas meter shown in FIG. 5b.
Figure 5E:
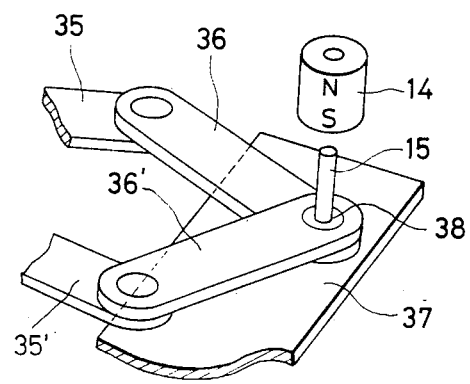
FIG. 5e is a perspective view showing the essential parts of the gas meter shown in FIG. 5b.
Figure 6:
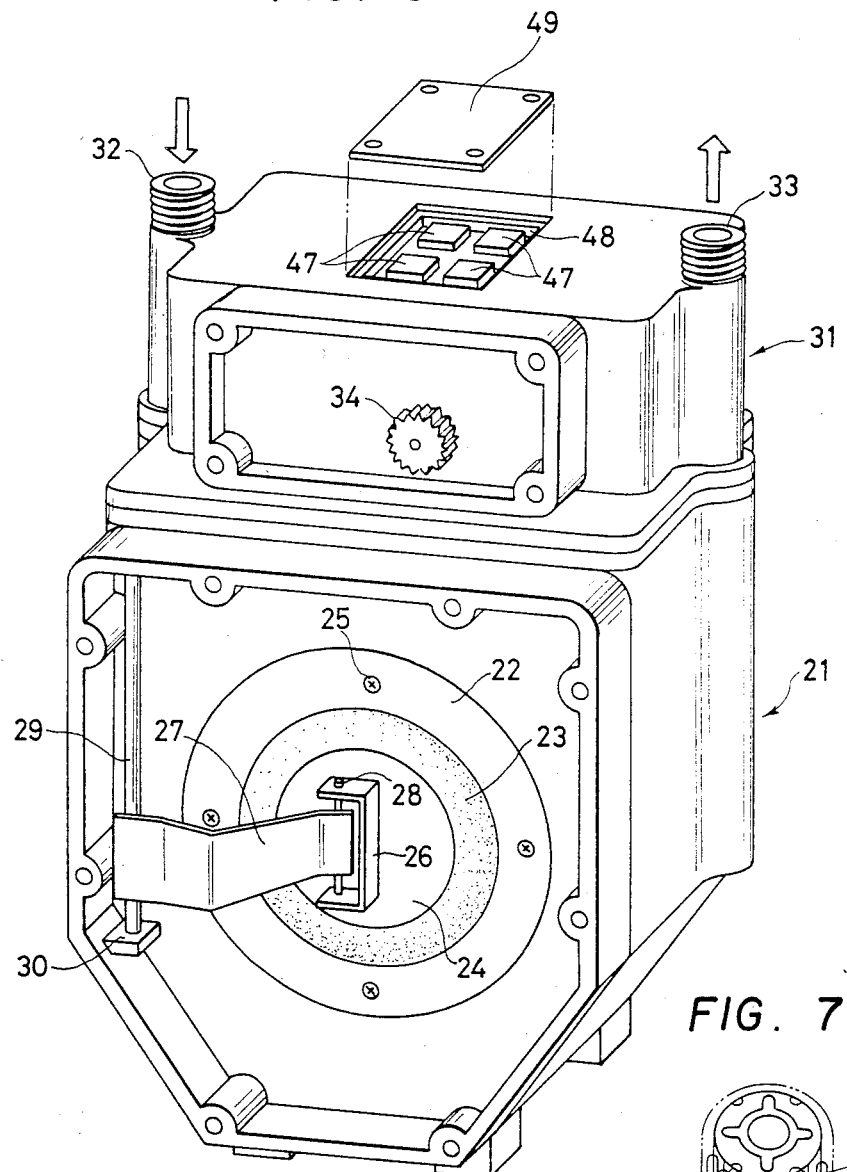
FIG. 6 is a perspective view showing the gas meter with its side cover removed, to which another embodiment of the present invention is applied.

The changeover valves 39 and 39' are provided with grooves 45 and 45' on the backs thereof, respectively, as shown in FIG. 5d, and when they swing, taking the pins 40 and 40' as their fulcrums, they change over the passages 43B and 43'B from the passages 43C and 43'C to the passages 43A and 43'A, and vice versa. As shown in FIG. 5b, the pin 38 comprises a circular rod 15 made of non-magnetic material such as stainless steel, onto which is fitted a cylindrical magnet 14, which has magnetic polarities N and S (or S and N) at the upper and lower portions thereof (see FIG. 5e). A sensor 47 ( or 12 in FIGS. 1 and 2) is attached onto the upper case 31 at a position which is opposite to the rotary plate 37, as shown in FIG. 5a. The upper case 31 is made of non-magnetic material and all parts near or adjacent to the magnet 14 are also made of non-magnetic material. In the case of another embodiment of the present invention shown in FIG. 6, four sensors 47 are attached onto the upper case 31 at those positions which are on the rotating path of the magnet 14 and which are opposite to four points uniformly positioned on the rotating path. These sensors 47 are not projected from the upper case 31 but housed in a housing groove 48 on the upper case 31, with a cover 49 closing the housing groove 48.

Gas entered through the gas inlet 32 pushes one of the diaphragms 23 and 23' while pulls the other thereof according to the positions of the changeover valves 39 and 39'. The rods 29 and 29' are thus rotated forward and backward, as shown by arrows α and β in FIG. 5b. Thererfore, the rotary plate 37 is rotated clockwise (or may be rotated counterclockwise), causing the changeover valves 39 and 39' to be swung by the linked arms 41 and 41' so as to change the communication between the passage 43'B and the passages 43'A, 43'C as well as the communication between the passage 43B and the passages 43A, 43C, so that the diaphragms 23 and 23' may be reversely forced to discharge gas in the chambers from the gas outlet 33 through the discharge passage 44. The diaphragms 23 and 23' are thus forced by gas pressure to move like the bellows to supply gas to the load through the gas outlet 33. The rotary plate 37 is rotated, as described above, if there exists any flow of gas, to thereby rotate the magnet 14. Therefore, the sensor 47 detects the rotating magnet, and causes the light emitting diode LED in the display 13 to be turned on to display that gas is being used. No meter is needed in this case.

Figure 7:
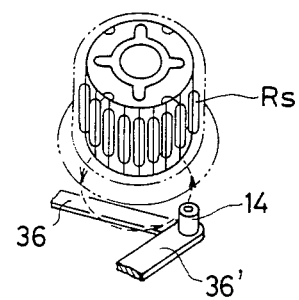
FIG. 7 is a perspective view showing a sensor which comprises a plurality of reed switches.

FIG. 7 shows a plurality of reed switches Rs used instead of the sensor 47 or the like. These plural reed switches Rs are positioned on the rotating path of the magnet 14, thus enabling an extremely small amount of gas flow (which may be caused when pilot fire in the gas appliance is forgetfully left burning, for example) to be detected.

As described above, the present invention enables any leak of gas to be detected and found at once before an accident occurs, by displaying the existence of gas flow when no gas is used. In addition, any of the magnets 11 and 14 is attached to the rotating member inside the housing and no mechanical connecting member is needed between the magnet 11 or 14 and the sensor 12 or 47, thus enabling the detector device of the present invention to be easily applied to any of the existing gas meters. The present invention can achieve a quick detection of gas leak by displaying at once the occurrence of gas flow, enhance safety by making it possible to detect any of gas leak before gas leaked comes to a large amount, and make the detector device extremly simple in construction.

Figure 8A:
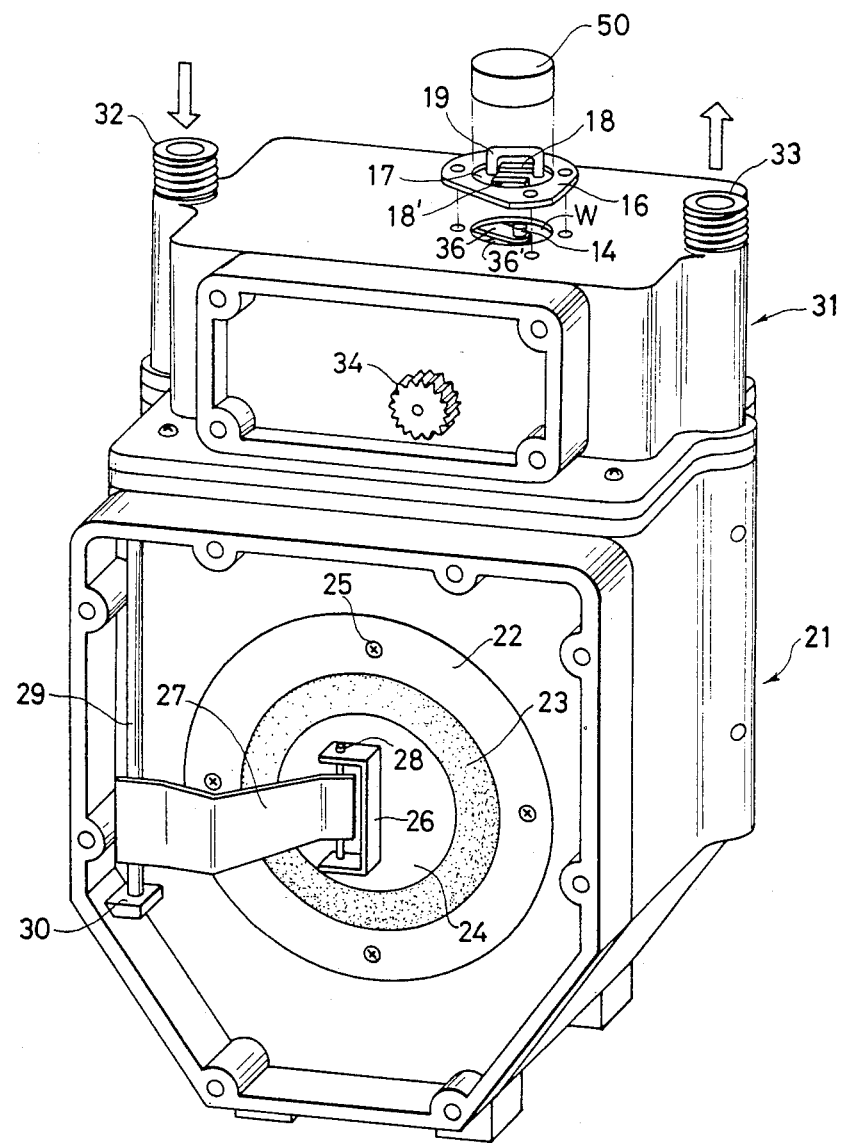
FIG. 8a is a perspective view showing the gas meter with its side cover removed, to which a gas shut-off means according to the present invention is applied.
Figure 8B:
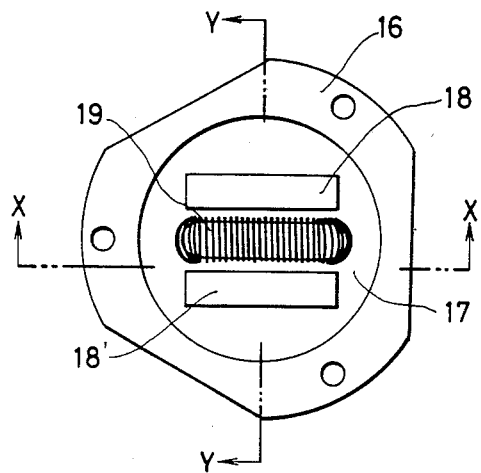
Figure 8C:
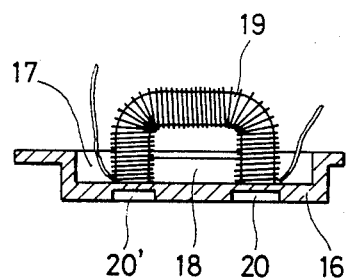
FIGS. 8c and 8d are sectional views taken along lines X—X and Y—Y in FIG. 8b, respectively.
Figure 8D:
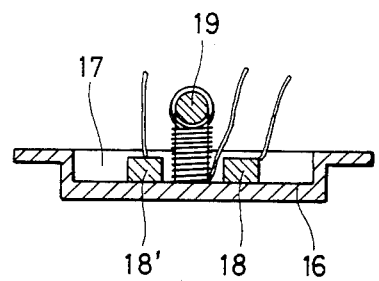
Figure 8E:
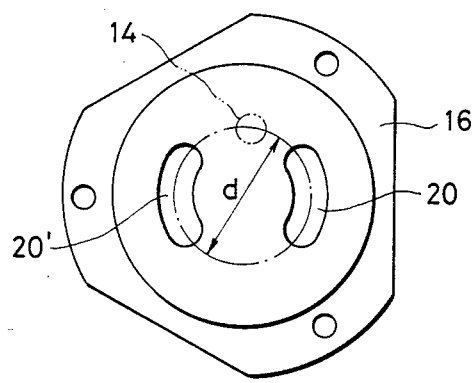
FIG. 8e shows the back of the cap shown in FIG. 8b.

FIG. 8a shows another gas meter provided with a gas shut-off means. A window W larger than the rotating path of the cylindrical magnet 14 is formed in the roof of the upper case 31 of the gas meter G and closed air-tightly by a cover 16. As shown in more detail in FIGS. 8b through 8e, the cover 16 is made of non-magnetic material so as to allow magnetic force to pass therethrough, and provided with a circular groove 17 therein (see FIG. 8c, for example). Sensors 18 and 18' comprising reed switches or the like and serving to detect the rotation of the magnet 14 are arranged in the recess 17 and an electromagnet 19 which operates at the time of gas shut-off is located between the sensors 18 and 18'. Numerals 20 and 20' represent elliptic grooves (see FIG. 8e), which are located corresponding to the electromagnet 19 to engage with the magnet 14 drawn by the electromagnet 19. In FIG. 8a, numeral 50 represents a case for covering the sensors 18, 18' and electormagnet 19. As described above, the rotary plate 37 rotates when any flow of gas exists and the magnet 14 is therefore rotated on a circle which passes through the center lines of the grooves 20 and 20' and has a diameter d, as shown by a dot and dash line in FIG. 8e. The movement of the magnet 14 is shown concretely in FIGS. 8f through 8i.

Figure 8F:
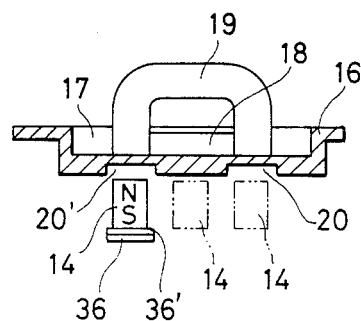
FIGS. 8f through 8i are sectional side views showing the movement of a magnetic material.

FIG. 8f shows a case of normally using gas, wherein the amount of gas flow changes in a relatively short time period and the rotation of the magnet 14 also changes accordingly. Therefore, the sensors 18 and 18' generate changing flow amount pulses and the electromagnet 19 is thus left inoperative, so that the magnet 14 continues to rotate along the underside of the groove 17, as shown by solid and two-dot and dash lines in FIG. 8f.

Figure 8G:
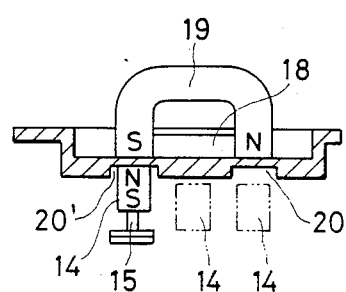

FIG. 8g shows a case where the amount of gas flow is kept constant and unchanged for a long time period, as will be seen when gas is leaking, and the rotation of the magnet 14 is kept constant this time. When the constant rotation of the magnet 14 is detected, therefore, the sensors 18 and 18' generate constant flow amount pulses through their electrical circuit to render the electromagnet 19 operative, so that the magnet 14 which keeps rotating, as shown by two-dot and dash lines, is drawn by the electromagnet 19, which is positioned in the groove 20' and has a polarity different from that of the magnet 14, to thereby engage with the groove 20', as shown by a solid line in FIG. 8g. A series of the rotating members such as the linked arms 36 and 36' are thus made inoperative and the gas supply operation of the gas meter is stopped completely to thereby shut off gas supply to the gas appliance. FIGS. 8f anf 8g show an example of polarities of the magnet 14 and electromagnet 19, and they may be made reverse in polarity.

Figure 8H:
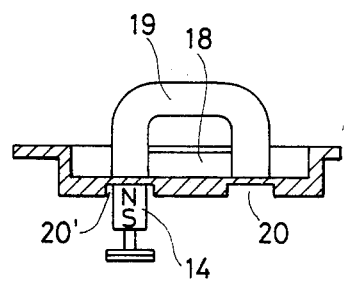

The time length necessary to shut off gas supply may correspond to a time length during which the magnet 14 rotates at least one time and current may be allowed to flow to the electromagnet 19 for a time length which corresponds to that necessary for one rotation of the magnet 14. When the electromagnet 19 has been once engaged with the magnet 14 through the groove 20 or 20', the magnet 14 is drawn by the electromagnet 19, even if the electromagnet 19 is deenergized, because the magnet 14 is located near the iron core (or ferromagnetic material) of the electromagnet 19, or the magnet 14 is urged against the side of the groove 20' by gas pressure applied from one side of the diaphragm to the diaphragm, so that the magnet 14 can be kept engaged with the electromagnet 19 through the groove 20', as shown in FIG. 8h, to continue the gas shut-off.

Figure 8I:
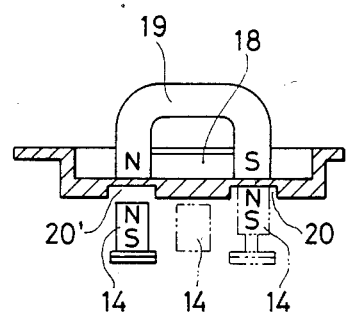

When the cause of shutting off gas is eliminated and the gas shut-off is to be released, the direction in which current flows through the electromagnet 19 is made reverse to have same polarity as that of the magnet 14, which is thus disengaged from the groove 20', as shown by a solid line in FIG. 8i, to normally supply gas. In a case where the gas shut-off is released but there still exists gas flow during the operation of the electromagnet 19, the gas shut-off is again carried out at a different polarity of the electromagnet 19, as shown by two-dot and dash lines in FIG. 8i.

This embodiment of the present invention comprises a magnet attached to the rotating member in the gas meter, a cover provided with sensors for detecting the rotation of the magnet and also provided with an electromagnet rendered operative in response to outputs of the sensors, and grooves formed in the bottom of the cover, corresponding to the electromagnet, to engage with the magnet. When the amount of gas flow is kept constant for a long time period, therefore, current is allowed to flow through the electromagnet in response to the sensors, so that the electromagnet thus energized draws the rotating magnet, causing the magnet to be engaged with one of the grooves to stop the operation of the gas meter and shut off gas supply. Therefore, this embodiment of the present invention enables gas leak and abnormal use of gas to be detected to shut off gas supply through the gas meter. In addition, the embodiment enables gas shut-off to be continued. As the result, the embodiment has such merits that gas can be reliably supplied, and that gas can be easily shut off.

I claim:

1. In a gas meter comprising a housing provided with a gas inlet and a gas outlet and made of non-magnetic material, a driver section provided with a rotary member which rotates according to the amount of gas flow, and a meter driven by the driver section for indicating the amount of gas flow, a device for detecting whether or not gas is being used in a room or inside a housing, said device comprising a first pair of link arms for transmitting the movement of at least one flow responsive diaphragm and a second pair of link arms for operating at least one changeover valve, said pairs of link arms being swingably attached to a rotary plate, cylindrical magnet attached to a point where the first pair of link arms is swingably attached to the rotary plate; sensor means, comprising a plurality of reed switches disposed in a cylindrical arrangement having a vertical axis, for detecting the rotation of the magnet, said reed switches being disposed on the roof of the housing in a configuration corresponding to the path of rotation of the magnet, and a display means driven by output of the sensor means for indicating that a small amount of gas is being used.

2. A device according to claim 1 further including a gas shut-off means comprising a cover provided with the sensors for detecting constant rotation of the cylindrical magnet and also provided with an electromagnet driven by output of the sensors, said cover being attached to a window formed in the housing of the gas meter, and grooves formed in the bottom of said cover, corresponding to the electromagnet, so as to engage with the cylindrical magnet.

3. A device according to claim 2 wherein said gas shut-off means further comprises means for detecting constant rotation of said magnet and for actuating said electromagnet to stop the rotation of said magnet and thereby shut off the flow of gas through said gas outlet.

* * * * *